United States Patent [19]
Ida et al.

[11] Patent Number: 5,191,601
[45] Date of Patent: Mar. 2, 1993

[54] VIDEO PHONE UNIT

[75] Inventors: Takashi Ida, Chiba; Kazuo Ohzeki; Kenshi Dachiku, both of Tokyo; Hideyuki Ueno, Kanagawa; Toshiaki Watanabe, Kanagawa; Yoshikuni Matsumura, Kanagawa, all of Japan

[73] Assignee: Kabushiki Kaisha Toshiba, Kawasaki, Japan

[21] Appl. No.: 680,355

[22] Filed: Apr. 4, 1991

[30] Foreign Application Priority Data

Apr. 4, 1990 [JP] Japan .................................. 2-88155
Mar. 7, 1991 [JP] Japan .................................. 3-041965

[51] Int. Cl.⁵ .......................... H04N 1/42; H04N 7/14
[52] U.S. Cl. ........................................ 379/53; 379/54; 358/85
[58] Field of Search .................... 379/53, 54; 358/85, 358/224

[56] References Cited

U.S. PATENT DOCUMENTS

| | | | |
|---|---|---|---|
| 4,258,387 | 3/1981 | Lemelson et al. | 379/53 |
| 4,330,797 | 5/1982 | Yokokawa et al. | 358/224 |
| 4,856,045 | 8/1989 | Hoshina | 379/53 |
| 4,928,300 | 5/1990 | Ogawa et al. | 379/53 |
| 5,036,390 | 7/1991 | Masunaga | 379/53 |

FOREIGN PATENT DOCUMENTS

| | | |
|---|---|---|
| 2119090 | 10/1972 | Fed. Rep. of Germany . |
| 59-158182 | 9/1984 | Japan . |
| 0177774 | 9/1985 | Japan ............ 358/224 |
| 61-255185 | 11/1986 | Japan . |
| 0132260 | 5/1989 | Japan ............ 379/53 |
| 0137764 | 5/1989 | Japan ............ 379/53 |
| 0149663 | 6/1989 | Japan ............ 379/53 |
| 0149664 | 6/1989 | Japan ............ 379/53 |
| 2229888 | 10/1990 | United Kingdom . |

OTHER PUBLICATIONS

Toshiba Newsletter, No. 316, Toshiba Corporation, Japan, Nov. 1988.

*Primary Examiner*—James L. Dwyer
*Assistant Examiner*—Jason Chan
*Attorney, Agent, or Firm*—Oblon, Spivak, McClelland, Maier & Neustadt

[57] ABSTRACT

A video phone unit comprising a decoder for expanding a received picture transmitted from the other party, a television camera for photographing a subject for producing a photographed picture on one party side, a hook for detecting whether the camera is immobile or mobile and generating either a first detecting signal indicating that the hook is in a mobile state or a second detecting signal indicating that the hook is immobile, a changeover switch for selecting either the received picture expanded at the decoder or the photographed picture taken at the camera after receiving the first or second detecting signal provided from the hook, a display for displaying one picture selected at the changeover switch, and a coder for compressing and transmitting the photographed picture provided from the camera to the other party.

16 Claims, 6 Drawing Sheets

VIDEO PHONE UNIT

BACKGROUND OF THE INVENTION

1. Field of the Invention

The present invention relates to a video phone unit with a television camera.

2. Description of the Background Art

Recently, the use of a video phone unit for transmitting a moving picture has been rapidly developing along with the increasing use of digital communication networks.

Normally, in a conventional video phone unit, the moving picture of one speaker is photographed by a movable television camera before being transmitted to the other speaker.

However, in the above conventional video phone unit, the speaker can not watch the television picture taken by the camera at his end of the line because the camera is secured to the body of the telephone. That is, the speaker can not select the area of which the picture is to be taken. Some types of television cameras can stand apart from the body of the telephone, but the television picture taken by the television camera can not be viewed by the speaker on the photographing side.

Also, in the above conventional video phone unit, because a subject is photographed while the photographed picture is being transmitted, a flickering picture is transmitted when the television camera is moved. Therefore, a receiver feels unpleasant. This imparts a disagreeable sensation to the person viewing the picture at the receiving end.

SUMMARY OF THE INVENTION

It is a first object of the present invention to provide a video phone unit in which an extended area can be photographed by the television camera and the television picture taken by the camera is easily viewed.

It is a second object of the present invention to provide a video phone unit in which a picture imparting an agreeable sensation to the viewer can be transmitted when the television camera is moved.

These objects are achieved in the present invention by the provision of a video phone unit for transmitting still or moving pictures between one party and an other party, comprising:

receiving means for receiving a picture transmitted from the other party;

photographing means for photographing a subject for producing a photographed picture on one party side, the photographing means being movable;

detecting means for detecting whether the photographing means is immobile or mobile and generating either a first detecting signal indicating that the photographing means is in a mobile state or a second detecting signal indicating that the photographing means is immobile;

first selecting means for selecting either the received picture at the receiving means or the photographed picture made at the photographing means after receiving the first or second detecting signal provided from the detecting means;

displaying means for displaying one picture selected at the first selecting means; and transmitting means for transmitting the photographed picture provided by the photographing means to the other party.

Also, it is preferable that the first selecting means selects the photographed picture made in the photographing means when the first detecting signal is provided from the detecting means and selects the received picture received in the receiving means when the second detecting signal is provided from the detecting means.

In the above structure of the video phone according to the present invention, the video phone is divided into the photographing means and a video phone body comprising the other means.

Normally, the movable photographing means is attached to the video phone body in an immobile state so that the first selecting means selects a received picture provided from the other party after receiving a second signal from the detecting means. Therefore, the received picture is displayed in the displaying means through the receiving means and the first selecting means. Also, the photographed picture photographed in the photographing means is transmitted to the other party through the transmitting means. In other words, both parties are able to telecommunicate with each other while viewing each others faces.

On the other hand, when the movable photographing means is set apart from the video phone body by one party on one party side, the first selecting means changes its selection from the received picture to the photographed picture automatically because the photograph means set apart from the video phone body is in the mobile state and the first selecting means receives a first detecting signal from the detecting means. Therefore, one party can directly view the photographed picture on his own side through the displaying means. This means that one party can select the photographing area arbitrarily while confirming the photographed picture. That is, the video phone according to the present invention allows one party to photograph the subject over a wider area easily while viewing the photographed picture on his own side.

Also, it is preferable to further include a second selecting means for selecting either arbitrary pictures or the photographed picture taken by the photographing means when the first or second detecting signal is provided from the detecting means and transmitting the selected picture to the other party through the transmitting means.

Moreover, it is preferable that the second selecting means stops transmitting the photographed picture taken in the photographing means to the other party when the first detecting signal is provided from the detecting means, while the second selecting means transmits the photographed picture to the other party when the second detecting signal is provided from the detecting means.

Further, it is preferable to further include an internal memory means for memorizing in advance a prescribed picture transmitted to the other party through the transmitting means instead of the photographed picture taken in the photographing means while the second selecting means stops transmitting the photographed picture to the other party.

In the above structure of the video phone according to the present invention, when the movable photographing means is set apart from the video phone body by one party, the other party receives the picture memorized in the internal memory means on one party side instead of the photographed picture taken in the photographing means on that side. Therefore, the other party always impart an agreeable sensation during the telecommunication with one party because the other party does not receive an unpleasant flickering picture.

DESCRIPTION OF THE SPECIFIC EMBODIMENT

A first preferred embodiment of a video phone according to the present invention is described with reference to FIGS. 1 to 3.

Figure 1:
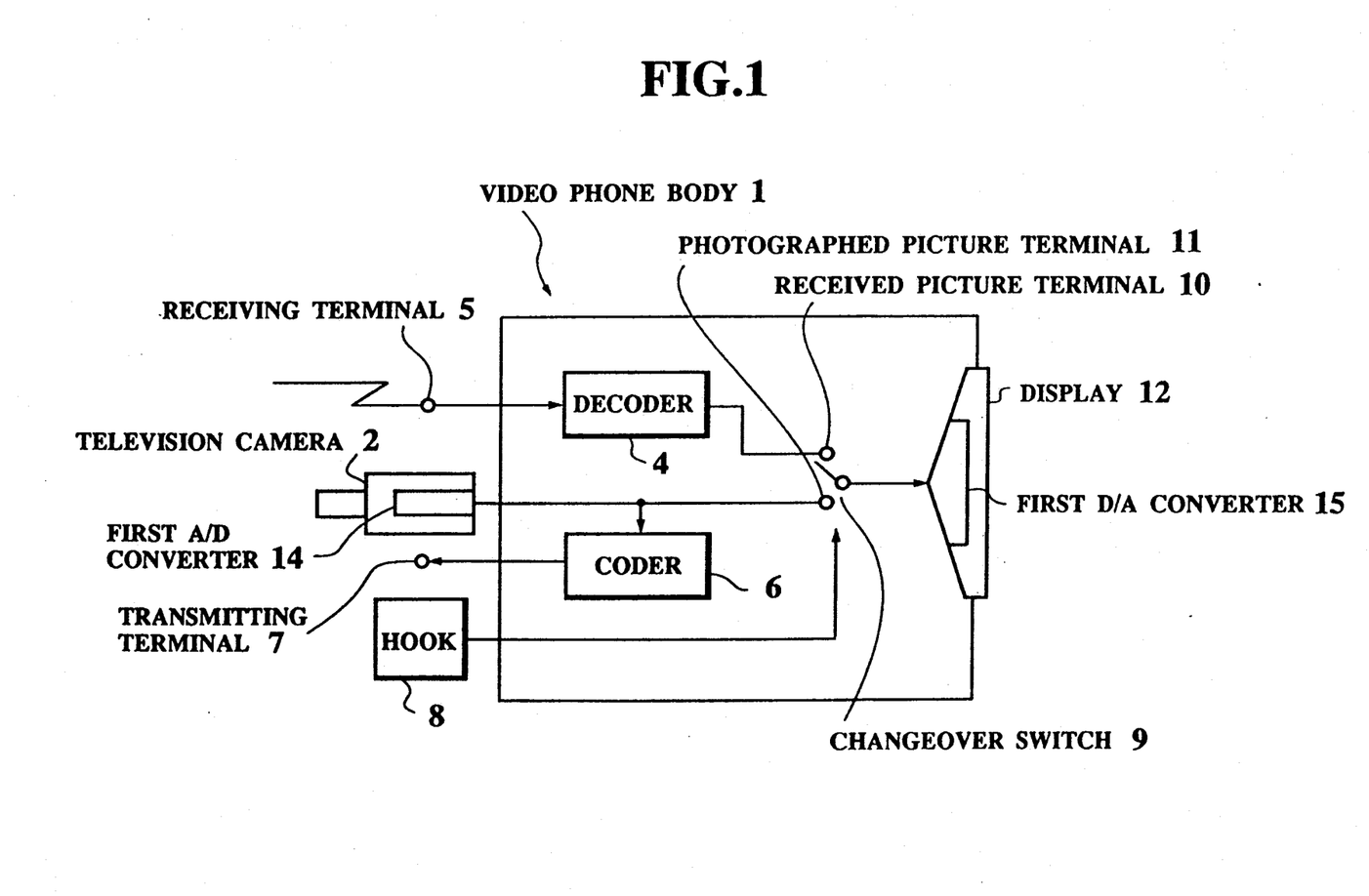
FIG. 1 is a block diagram of a video phone according to the present invention, showing a first embodiment for achieving the first object.
Figure 2:
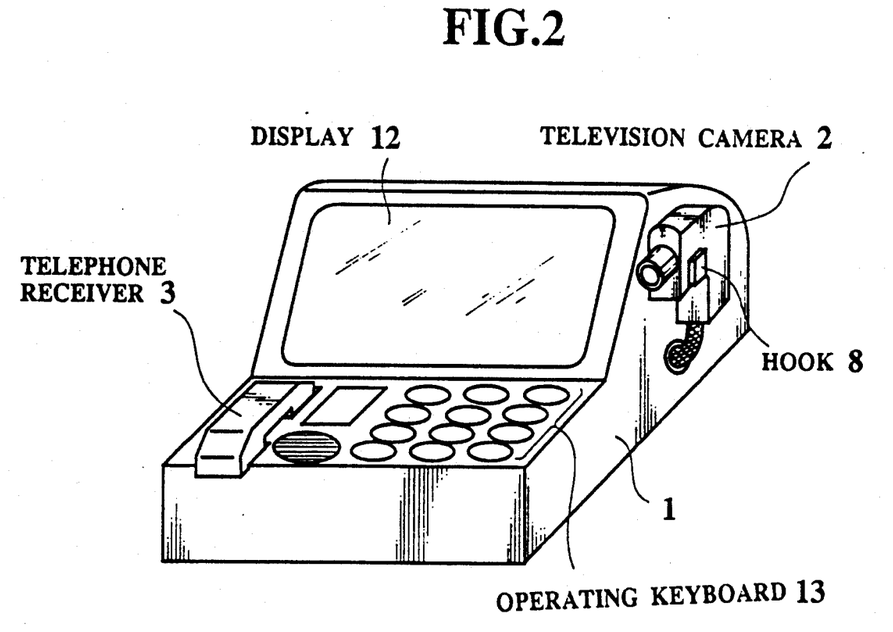
FIG. 2 is a diagonal view of the video phone shown in FIG. 1 when a television camera is attached to a video phone body.
Figure 3:
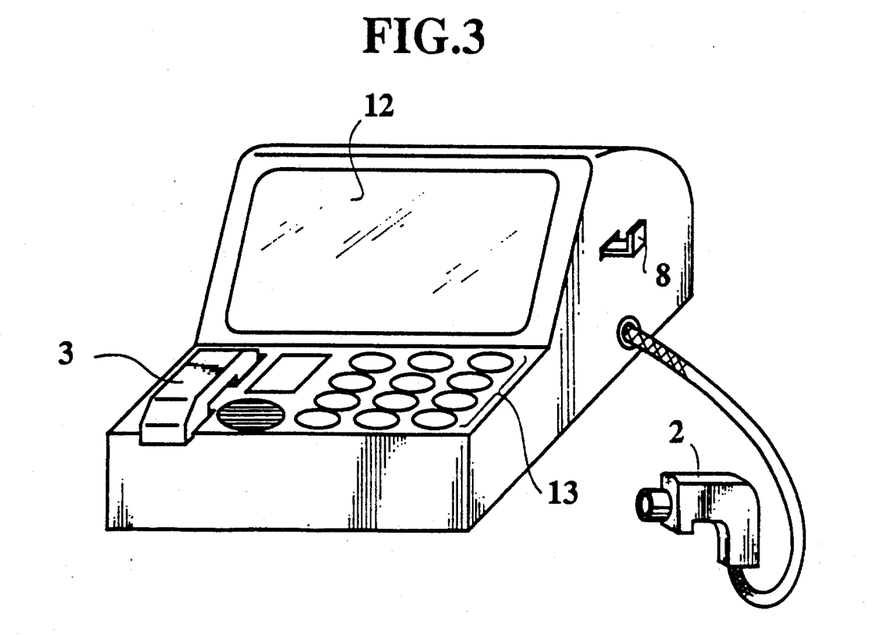
FIG. 3 is a diagonal view of the video phone shown in FIG. 1 when the television camera is set apart from the video phone body.

As shown in FIGS. 1 to 3, the video phone for transmitting still or moving pictures between one party and an other party comprises a video phone body 1 and a television camera 2 for photographing a still or moving picture and which is attached to the video phone body 1, the television camera 2 being movable and capable of being easily set apart from the video phone body 1.

The video phone body 1 comprises:

a telephone receiver 3 for telecommunicating with the other party by voice;

a decoder 4 for expanding a still or moving picture received from the other party through a receiving terminal 5, the picture being called a received picture and compressed for improving the efficiency of the transmission between one party and the other party;

a coder 6 for compressing a still or moving picture taken by the television camera 2 to be transmitted to the other party through a transmitting terminal 7 with high efficiency, the picture being called a photographed picture;

a hook 8 for hooking the camera 2 and generating a first detecting signal when the camera 2 is set apart from the hook 8 in a mobile state and a second detecting signal when the camera 2 is attached to the hook 8 in an immobile state, the camera 2 being easily attached or set apart from the hook 8;

a changeover switch 9 for selecting the received picture transmitted through a received picture terminal 10 when the second detecting signal is provided from the hook 8 and for selecting the photographed picture made in the camera 2 when the first detecting signal is provided from the hook 8;

a display 12 for displaying either the received picture or the photographed picture selected by the changeover switch 9; and an operating keyboard 13 for adjusting the voice transmitted through the telephone receiver 3 or the picture displayed in the display 12.

The camera 2 is provided with a first analog-to-digital converter 14 for converting the photographed picture which is analog to a digital photographed picture. Therefore, the camera 2 provides the digital photographed picture to the changeover switch 9.

The still or moving picture expanded in the decoder 4 is a digital received picture so that the decoder 4 provides the digital received picture to the changeover switch 9.

The changeover switch 9 comprises a 54/74F157A Quad 2-Input Multiplexer purchased from the National Semiconductor Co. LTD. The multiplexer handles digital signals.

The display 12 is provided with a first digital-to-analog converter 15 for converting the digital picture selected in the changeover switch 9 to an analog picture to display in the display 12.

Also, the changeover switch 9 selects the photographed picture under control of the first detecting signal provided from the hook 8 when the camera 7 is removed from the hook 8, while the changeover switch 9 selects the received picture under control of the second detecting signal provided from the hook 8 when the camera 7 is attached to the hook 8.

In the above structure of the video phone, the operation is explained as follows.

In the following explanation, the term "photographed picture" is used for the picture made in the camera 2 for the sake of convenience. Also, the term "received picture" is used for the picture transmitted from the other party and received at the receiving terminal 5 for the sake of convenience.

Normally, the camera 2 is attached to the video phone body 1 to photograph the one party as shown in FIG. 2 so that a second detecting signal is generated in the hook 8 and provided to the changeover switch 9. The camera 2 transmits the photographed picture through both the coder 6 and the transmitting terminal 7 to the other party. At the same time, a received picture received at the receiving terminal 5 is displayed in the display 12 through the decoder 4 and the changeover switch 9 because the changeover switch 9 receives the second detecting signal from the hook 8 and selects the received picture for transmitting to the display 12. Therefore, both parties are able to talk with each other while viewing each received picture.

On the other hand, when the one party wants to transmit a different picture which is a photograph of a different subject, that party removes the camera 2 from the video phone 1 as shown in FIG. 3. Therefore, in the conventional video phone, the one party can not recognize what the camera 2 photographs because the photographed picture is transmitted to the other party and not transmitted to the one party. This means that the one party can not select the photographed area arbitrarily while viewing the photographed picture. However, in the present invention, the hook 8 detects that the camera 2 is set apart from the video phone body 1 and provides a first detecting signal to the changeover switch 9 so that the switch 9 changes the selection from the received picture to the photographed picture.

Accordingly, the one party can select the photographed area arbitrarily while viewing the photographed picture. This means that the extended area can be photographed by the television camera.

Next, a second embodiment is explained with reference to FIG. 4 for achieving the first object and the second object.

The same reference code numbers are used in the following description and figures for the same elements described in the previous description and figures.

A video phone of the second embodiment according to the present invention comprises a video phone body 20 and a television camera 21 attached to the video phone body 20, the camera 21 being movable and capable of being easily set apart from the video phone body 20.

The television camera 21 is provided with the first analog-to-digital converter 14 and an operating switch 22 which is integrally formed with the camera 21, the operating switch 22 being operated by the one party at will.

The video phone body 20 comprises:
the telephone receiver 3;
a hook 23 for hooking the camera 21 and generating a first detecting signal when the camera 21 is removed from the hook 23 in a mobile state and a second detecting signal when the camera 21 is attached to the hook 23 and is immobile;
the decoder 4;
the coder 6;
an internal memory section 24 for memorizing in advance a prescribed picture;
a second changeover switch 25 for
(1) selecting the memorized picture in the internal memory section 24 when the first detecting signal is provided from the hook 23 and
(2) selecting the photographed picture taken in the camera 21 when the second detecting signal is provided from the hook 23 and transmitting the selected picture to the other party through the transmitting terminal 7.
the changeover switch 9 for selecting the received picture or the photographed picture after receiving the second or first detecting signal provided from the hook 23;
the display 12; and
the operating keyboard 13.

The operating switch 22 is operated to change the selection in the second changeover switch 25 from the picture memorized in the internal memory section 24 to the photographed picture when the camera 21 is set in an immobile state in a new position and the focus of the camera 21 is adjusted in spite of being removed from the hook 23.

The second changeover switch 25 also comprises a 54/74F157A Quad 2-Input Multiplexer.

In the above structure, when the camera 21 is attached to the video phone unit 20, the photographed picture is transmitted to the other party through the coder 6 and the second changeover switch 25 because a second detecting signal is provided from the hook 23 to the second changeover switch 25. Therefore, the other party does not receive an unpleasant sensation because the picture is not flickering.

When the camera 21 is set apart from the video phone unit 20, the picture memorized in the internal memory section 24 is transmitted to the other party through the second changeover switch 25 because a first detecting signal is provided from the hook 23 to the second changeover switch 25. Therefore, the photographed picture which is flickering in sychronization with the flickering of the camera 21 is not transmitted to the other party.

In compensation, the other party can receive the memorized picture which does not impart an unpleasant sensation because the picture is not flickering.

When the camera 21 is set to a new photographing point to photograph a new subject and its focus is adjusted, the second changeover switch 25 changes its selection from the memorized picture to the photographed picture because a control signal generated by the operating switch 22 is provided to the second changeover switch 25. The operating switch 22 can be operated by the one party at will.

Accordingly, the video phone of the second embodiment can transmit only a non-flickering picture to the other party so that only a pleasant sensation is imparted.

Also, the one party can transmit a new and meaningful picture quickly so that the communication between the parties is comfortable.

It is preferable that the video phone be provided with an external memory instead of the internal memory section 24. In this case, a picture memorized in the external memory is transmitted to the other party through an input terminal and the second changeover switch 25.

Figure 5:
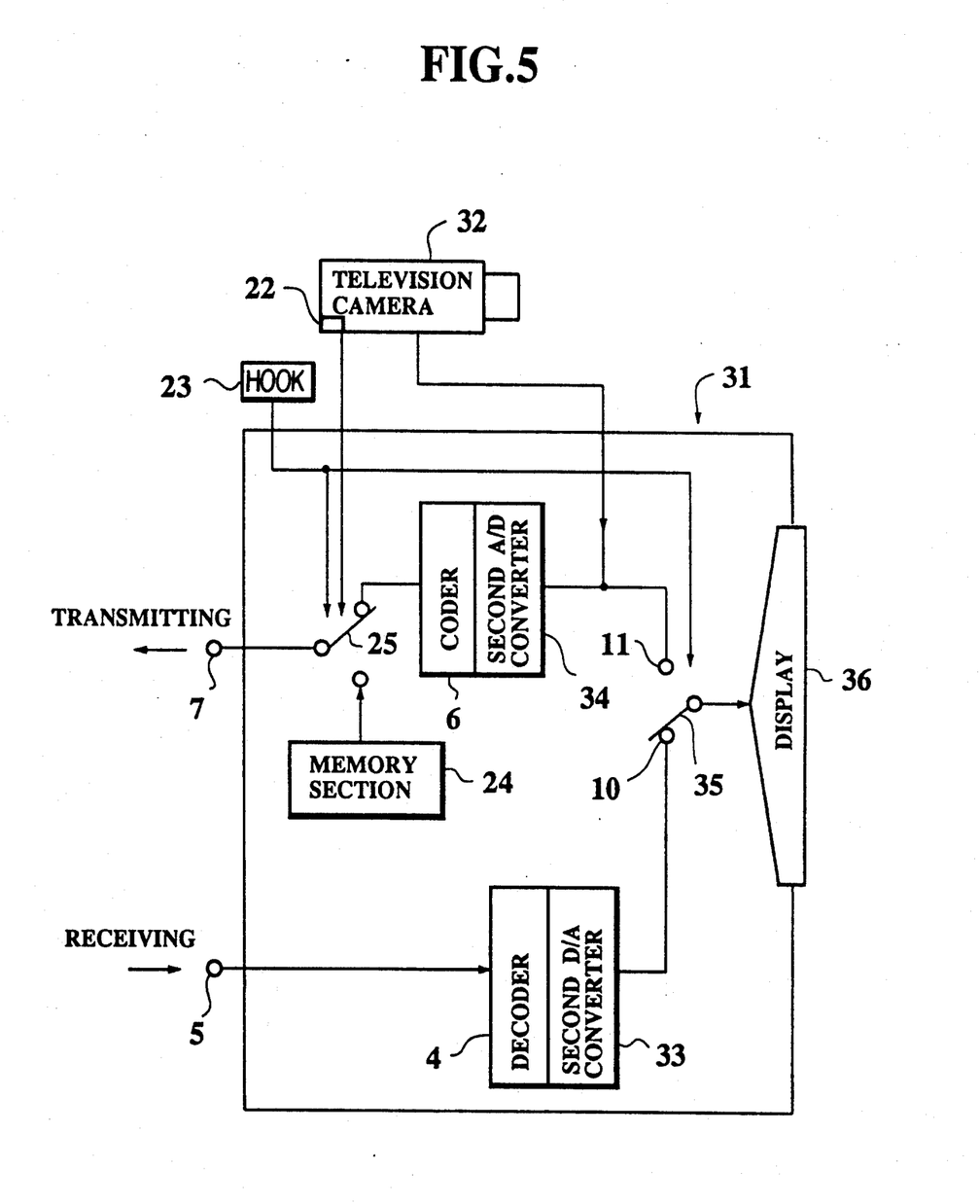
FIG. 5 is a block diagram of a video phone according to the present invention, showing a third embodiment for achieving the first and second objects.

Next, a third embodiment is explained with reference to FIG. 5 as follows

A video phone of the third embodiment according to the present invention comprises a video phone body 31 and a television camera 32 provided with the operating switch 22.

The television camera 32 is movable and capable being set apart from the video phone body 31. It provides a photographed picture to the video phone body 31.

the video phone body 31 comprises:
the telephone receiver 3;
the operating keyboard 13;
the hook 23;
the decoder 4;
a second digital-to-analog converter 33 for converting the digital received picture expanded at the decoder 4 to the analog received picture;
a second analog-to-digital converter 34 for converting the analog photographed picture provided from the camera 32 to the digital photographed picture;
the coder 6 for compressing the photographed picture converted at the second analog-to-digital converter 34;
the internal memory section 24;
the second changeover switch 25;
a first analog changeover switch 35 for selecting the analog received picture converted at the second digital-to-analog converter 33 when the second detecting signal is provided from the hook 23 and selecting the analog photographed picture photographed in the camera 32 when the first detecting signal is provided from the hook 23;
a display 36 for displaying the analog received picture or the analog photographed picture selected in the first analog changeover switch 35; and
the first analog changeover switch 35, comprising a HI-518 CMOS high speed analog multiplexer purchased from the HARRIS semiconductor products division. The multiplexer handles analog signals.

In the above structure, a received picture is transmitted from the other party to the receiving terminal 5 on the one party side. The received picture comprises digital signals for transmitting the signal between the one party and the other party. However, the display 12 can be operated by receiving only analog signals. Therefore, the digital received picture is converted to an analog received picture at the second digital-to-analog converter 33 after being expanded in the decoder 4. Then, the analog received picture is provided to the analog changeover switch 35.

Also, a photographed picture is produced in the camera 32 and the obtained photographed picture is analog. Then, the analog photographed picture is provided to the analog changeover switch 35 without being converted to a digital picture. The analog changeover switch 35 handles only analog pictures. Therefore, the switch 35 selects one analog picture to send the picture to the display 36 according to a prescribed protocol as described in FIG. 4.

Figure 4:
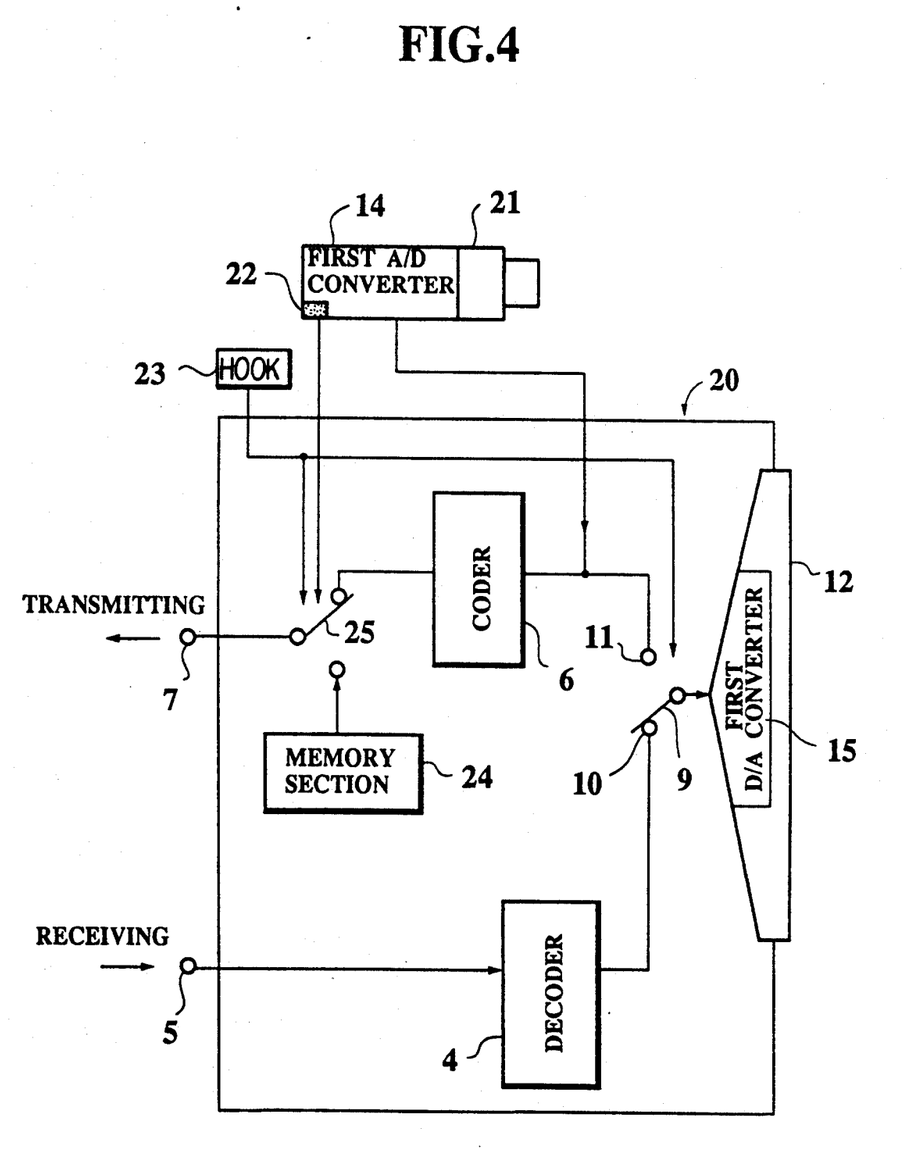
FIG. 4 is a block diagram of a video phone according to the present invention, showing a second embodiment for achieving the first and second objects.

On the other hand, the analog photographed picture is transmitted to the other party after being converted at the second analog-to-digital converter 34 when the second changeover switch 25 selects the photographed picture according to the prescribed protocol as described in FIG. 4.

Accordingly, in the video phone with the analog changeover switch 35, the received picture or the photographed picture are displayed in the display 36 alternatively to achieve the first object in the same manner as the video phone with the digital changeover switch 9.

Also, the photographed picture or a picture memorized in the internal memory section 24 is transmitted to the other party alternatively to achieve the second object.

Next, a video phone of a fourth embodiment according to the present invention is described with reference to FIG. 6 for achieving the first object.

Figure 6:
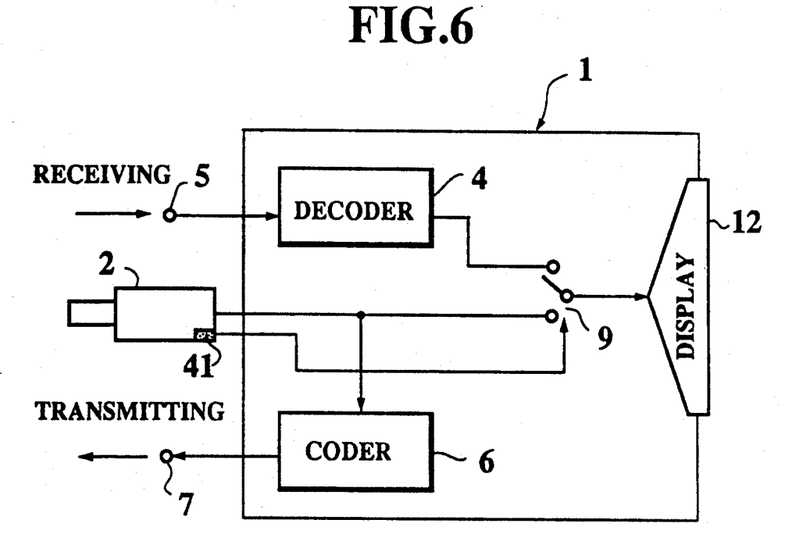
FIG. 6 is a block diagram of a video phone according to the present invention, showing a fourth embodiment for achieving the first object by using an operating switch.

Compared with the video phone of the first embodiment as shown in FIG. 1, the video phone of the fourth embodiment as shown in FIG. 6 is provided with an operating switch 41 instead of the hook 8.

The operating switch 41 is integrally formed with the television camera 2 and operated by the one party by hand.

In the above structure, the changeover switch 9 selects a photographed picture taken in the camera 2 when a first operating signal provided from the operating switch 41 is provided to the switch 9 and selects a received picture transmitted from the other party when a second operating signal provided from the operating switch 41 is provided to the switch 9.

Accordingly, the one party can select the picture displayed in the display 12 at will. This means that the one party can view and confirm the received picture in the display 12 when the camera 41 is set apart from the video phone unit 1, if necessary.

Next, a video phone of a fifth embodiment according to the present invention is described with reference to FIG. 7 for achieving the first object.

Figure 7:
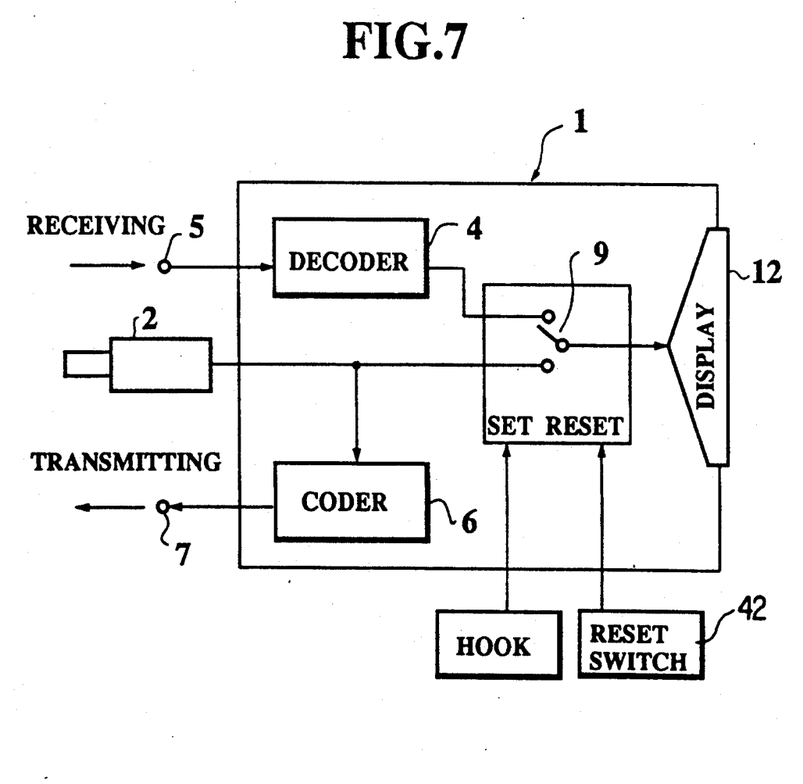
FIG. 7 is a block diagram of a video phone according to the present invention, showing a fifth embodiment for achieving the first object by using a hook and a reset switch.

Compared with the video phone of the first embodiment as shown in FIG. 1, the video phone of the fifth embodiment as shown in FIG. 7 further includes an reset switch 42 for changing over the selection of the changeover switch 9 by the one party.

In the above structure, when the reset switch 42 is operated after the changeover switch 9 selects a photographed picture, the selection of the changeover switch 9 is changed from the photographed picture to a received picture. Similarly, when the reset switch 42 is operated after the changeover switch 9 has selected the received picture, the selection of the changeover switch 9 is changed from the received picture to the photographed picture.

Accordingly, the one party can select the picture displayed in the display 12 at will in the same manner as the video phone of the fourth embodiment as shown in FIG. 6.

Next, a television camera of a second modification according to the present invention in comparison with the television camera 2 of the first modification as shown in FIG. 1 is described with reference to FIG. 8.

A television camera 51 of the second modification comprises:

a lens 52 for focusing incident light reflected from a subject;

a video device 53 for converting the incident light focused in the lens 52 to a video signal, the video signal being transmitted to the changeover switch 9 in the video phone body 1;

an on-off switch 54 through which the video signal converted in the video device 53 is passed when the switch 54 receives the first detecting signal from the hook 8; and a display 55 for displaying the video signal passing through the switch 54.

In the above structure, the incident light reflected from the subject for photography is converted to a video signal at the video device 53 after being focused at the lens 52. The video signal obtained at the video device 53 is provided to the display 55 to display the subject to the one party when the switch 54 is closed by receiving a first detecting signal from the hook 8.

Accordingly, the one party can be away from the video phone body 1 because that party can always view the subject for photography in the display 55 attached to the camera 51. This means that a photographed area for photographing a desired subject is expanded.

It is preferable that the video phone body 1 be provided with the the operating switch 41 as shown in FIG. 6 instead of the hook 8.

Figure 9:
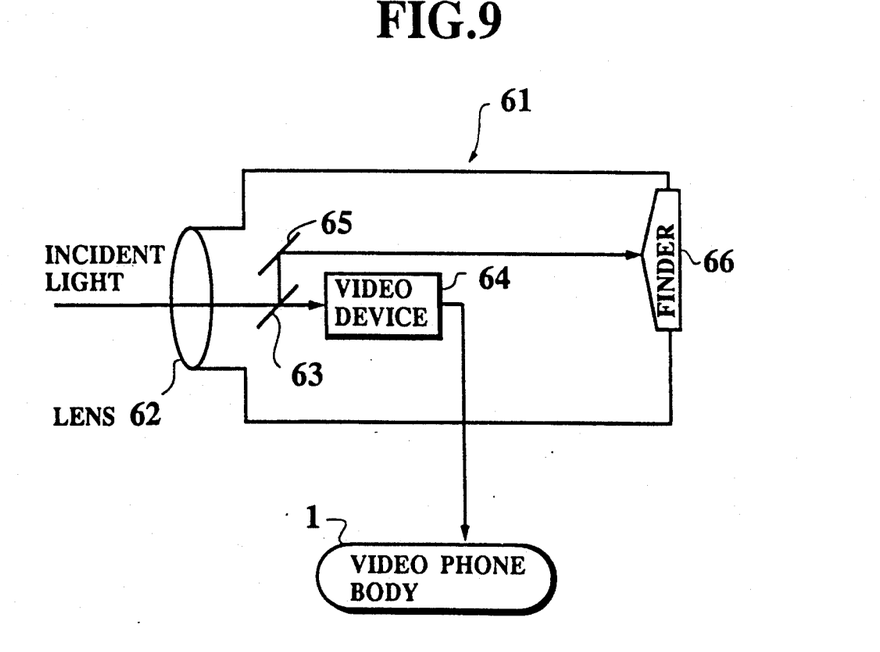
FIG. 9 is a block diagram of a television camera shown in FIG. 1, showing a third modification of the camera.

Next, a television camera of a third modification according to the present invention ia compared with the television camera 2 of the first modification as shown in FIG. 1 and is described with reference to FIG. 9.

A television camera 61 of the third modification comprises: a lens 62 for focusing incident light reflected from a subject for photography;

a spectroscope 63 for dividing the incident light focused in the lens 62;

a video device 64 for converting one part of the incident light divided in the spectroscope 63 to a video signal, the video signal transmitted to the changeover switch 9 in the video phone body 1 and the other party;

a reflecting mirror 65 for reflecting the other part of the incident light divided in the spectroscope 63; and a finder 66 for displaying the other part of the incident light reflected in the reflecting mirror 65.

In the above structure, the incident light reflected from the subject for photography is divided into two parts at the spectroscope 63 after being focused at the lens 62. One part of the incident light is converted to the photographed picture at the video device 64 to be provided to the changeover switch 9 in the video phone body 1 and the other party. On the other hand, the other part of the incident light is viewed by the one party through the finder 66 after being reflected at the reflecting mirror 65.

Figure 8:
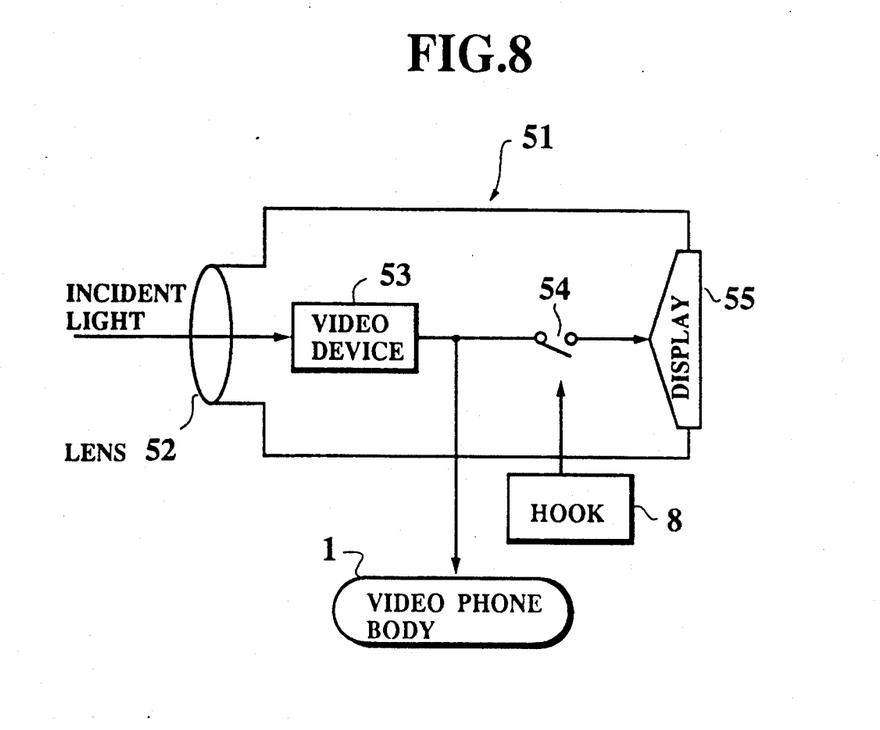
FIG. 8 is a block diagram of a television camera shown in FIG. 1, showing a second modification of the camera.

Accordingly, compared with the second modification as shown in FIG. 8, the one party can view and confirm the subject for photography economically because the television camera 61 is provided with the finder 66 which is cheaper than the display 55. Also, the one party can be away from the video phone body 1 so that the photographed area for photographing the subjects is expanded in the same manner as in the second modification.

In the above embodiments, it is preferable that the cameras 2, 21, 32 be an auto focus type for quickly adjusting the focus automatically and transmitting a new photographed picture to the other party.

Also, it is preferable that the cameras 2, 21, 32 be provided with a microphone for transmitting the surrounding sound or voice on the one party side with the photographed picture.

Also, it is preferable that the photographed picture be displayed at the one part of the displaying area of the display 12, 36 while the received picture is displayed at the other part of the displaying area of the displays 12, 36 when the changeover switches 9, 35 select the photographed picture.

Also, it is preferable that the photographed picture taken in the cameras 2, 21, 32 be transmitted to the video phone bodies 1, 31 in the radio communication.

Having illustrated and described the principles of our invention in a preferred embodiment thereof, it should be readily apparent to those skilled in the art that the invention can be modified in arrangement and detail without departing from such principles. We claim all modifications coming within the sprit and scope of the accompanying claims.

What is claimed is:

1. A video phone unit for transmitting still or moving pictures between one party and the other party, comprising:
    receiving means for receiving a digital picture transmitted from the other party;
    photographing means for photographing a subject to produce an analog photographed picture on the one party side, the photographing means being movable;
    detecting means for detecting whether the photographing means is immobile or mobile and for generating either a first detecting signal indicating that the photographing means is in a mobile state or a second detecting signal indicating that the photographing means is immobile;
    first selecting means for selecting the digital received picture transmitted from the receiving means when the second detecting signal is provided from the detecting means and for selecting the analog photographed picture transmitted from the photographing means when the first detecting signal is provided from the detecting means;
    displaying means for displaying either the digital received picture or the analog photographed picture which is selected at the first selecting means; and
    transmitting means for transmitting the analog photographed picture provided by the photographing means to the other party.

2. A video phone unit in claim 1 in which the detecting means is a hook for attaching the photographing means, the photographing means easily attached or removed from the hook.

3. A video phone unit in claim 1 in which the photographing means is a television camera.

4. A video phone unit in claim 1 in which the photographing means is provided with a first analog-to-digital converter for converting the analog photographed picture to a digital photographed picture;
    the first selecting means is a first digital changeover switch for selecting either the digital photographed picture or the digital received picture; and
    the displaying means is provided with a second digital-to-analog converter for converting either the digital received picture or the digital photographed picture which is selected in the first selecting means to an analog picture to display in the displaying means.

5. A video phone unit in claim 1 further including:
    a reset switch for changing over the selection of the first selecting means by the one party.

6. A video phone unit in claim 1 in which the photographing means comprising:
    a lens for focusing incident light reflected from the subject;
    a video device for converting the incident light focused in the lens to a video signal, the video signal being transmitted to the first selecting means;
    a switch through which the video signal converted in the video device passes when the switch receives the first detecting signal from the detecting means; and
    a display for displaying the video signal passing through the switch.

7. A video phone unit in claim 1 in which the photographing means comprising:
    a lens for focusing incident light reflected from the subject;
    a spectroscope for dividing the incident light focused in the lens into two part;
    a video device for converting one part of the incident light divided in the spectroscope to a video signal, the video signal being transmitted to the first selecting means; and
    a finder for displaying the other part of the incident light divided in the spectroscope.

8. A video phone unit in claim 1 in which the photographing means is provided with a microphone for transmitting voice on the one party side with the photographed picture.

9. A video phone unit in claim 1 in which the receiving means is provided with a digital-to-analog converter for converting the digital received picture received at the receiving means to an analog received picture; and
    the first selecting means is a first analog changeover switch for selecting the analog received picture or the analog photographed picture.

10. A video phone unit in claim 1 in which the received digital picture transmitted from the receiving means is selected in the first selecting means when the second detecting signal is provided from the detecting means, and the photographed picture transmitted from the photographing means is selected in the first selecting means when the first detecting signal is provided from the detecting means.

11. A video phone unit for transmitting still or moving pictures between one party and an other party, comprising:

receiving means for receiving a picture transmitted from the other party;

photographing means for photographing a subject to produce a photographed picture on the one party side, the photographing means being movable;

detecting means for detecting whether the photographing means is immobile or mobile and for generating either a first detecting signal indicating that the photographing means is in a mobile state or a second detecting signal indicating that the photographing means is immobile;

first selecting means for selecting either the received picture transmitted from the receiving means or the photographed picture transmitted from the photographing means after receiving the first or second detecting signal provided from the detecting means;

displaying means for displaying either the received picture or the photographed picture which is selected at the first selecting means;

internal memory means for memorizing an internal picture;

second selecting means for selecting the internal picture memorized in the internal memory means when the first detecting signal is provided from the detecting means and for selecting the photographed picture taken in the photographing means when the second detecting signal is provided from the detecting means;

operating switch means for changing the internal picture selected by the second selecting means to the photographed picture in cases where the internal picture is selected by the second selecting means, the operating switch means being operated by the one party after the photographing means is immobily set in the mobile state; and     transmitting means for transmitting to the other party either the photographed picture or the internal picture which is selected by the second selecting means and the operating switch means.

12. A video phone unit in claim 11 in which the operating switch is integrally formed with the photographing means.

13. A video phone unit in claim 11 in which the detecting means is a hook for attaching the photographing means, the photographing means being easily attached or removed from the hook.

14. A video phone unit in claim 11 in which the photographing means is a television camera.

15. A video phone unit in claim 11 in which the photographing means is provided with a microphone for transmitting voice on the one party side with the photographed picture.

16. A video phone unit in claim 11 in which the photographing means is an auto focus television camera in which the focus of the camera is automatically adjusted; and     the operating switch means is operated after the focus adjustment of the camera is finished.

* * * * *